(12) United States Patent
Kaminski et al.

(10) Patent No.: US 8,077,030 B2
(45) Date of Patent: Dec. 13, 2011

(54) TRACKING SYSTEM WITH SEPARATED TRACKING DEVICE

(75) Inventors: Joseph W. Kaminski, Campbell, CA (US); Jb Bittner Eriksen, Denver, CO (US); Ronald L. Pellegrini, Palo Alto, CA (US); Patrick E. Bertagna, Los Angeles, CA (US)

(73) Assignee: Global Trek Xploration Corp., Los Angeles, CA (US)

( * ) Notice: Subject to any disclaimer, the term of this patent is extended or adjusted under 35 U.S.C. 154(b) by 554 days.

(21) Appl. No.: 12/228,158

(22) Filed: Aug. 8, 2008

(65) Prior Publication Data

US 2010/0033321 A1 Feb. 11, 2010

(51) Int. Cl.
*G08B 1/08* (2006.01)
(52) U.S. Cl. ............. 340/539.13; 340/572.1; 340/572.5; 340/572.7; 340/573.1; 340/573.4; 340/693.5; 701/214; 701/215; 701/220; 455/404.2
(58) Field of Classification Search ............. 340/539.13, 340/573.1, 573.4, 693.5, 572.1, 572.5, 572.7; 701/214, 215, 220; 455/404.2
See application file for complete search history.

(56) References Cited

U.S. PATENT DOCUMENTS

| | | |
|---|---|---|
| 1,574,485 A | 2/1926 | Hylard |
| 1,597,823 A | 8/1926 | Randolph |
| 2,760,278 A | 8/1956 | Agrillo |
| 2,897,609 A | 8/1959 | Bodkin |
| 3,041,021 A | 6/1962 | Jaffe |
| 4,079,364 A | 3/1978 | Antenore |
| 4,350,853 A | 9/1982 | Ganyard |
| 4,662,850 A | 5/1987 | Bostic, Sr. |
| 4,703,445 A | 10/1987 | Dassler |
| 4,813,025 A | 3/1989 | Rowland et al. |
| 4,870,700 A | 9/1989 | Ormanns et al. |
| 5,285,586 A | 2/1994 | Goldston et al. |
| 5,326,297 A | 7/1994 | Loughlin |
| 5,331,602 A | 7/1994 | McLaren |

(Continued)

FOREIGN PATENT DOCUMENTS

CA 2248382 A1 4/2000

(Continued)

OTHER PUBLICATIONS

PCT Application No. PCT/US2009/004530, International Search Report and Written Opinion dated Sep. 22, 2009.

(Continued)

*Primary Examiner* — Tai T Nguyen
(74) *Attorney, Agent, or Firm* — Henneman & Associates, PLC; Larry E. Henneman, Jr.

(57) ABSTRACT

A separated tracking device includes a first portion including a location determining device operative to receive signals from a positioning system, a wireless communication device operative to communicate the location data from the first portion to a second portion of the tracking device, the second portion including a wireless data transceiver operable to transmit the location data to a remote server. In a particular embodiment, the first portion of the tracking device is attached to a first shoe and the second portion of the tracking device is incorporated in a second shoe. In another embodiment, the second portion of the tracking device is incorporated in a hand-held device. A method for manufacturing a separated tracking device and a method of operating a separated tracking device are also disclosed.

19 Claims, 8 Drawing Sheets

U.S. PATENT DOCUMENTS

| | | | |
|---|---|---|---|
| 5,473,518 A | 12/1995 | Haber et al. | |
| 5,532,679 A | 7/1996 | Baxter, Jr. | |
| 5,557,259 A | 9/1996 | Musa | |
| 5,574,423 A | 11/1996 | Vosika et al. | |
| 5,574,432 A | 11/1996 | McCarthy | |
| 5,579,285 A | 11/1996 | Hubert | |
| 5,654,692 A | 8/1997 | Baxter, Jr. et al. | |
| 5,655,316 A | 8/1997 | Huang | |
| 5,742,233 A * | 4/1998 | Hoffman et al. | 340/573.1 |
| 5,748,087 A | 5/1998 | Ingargiola et al. | |
| 5,825,327 A | 10/1998 | Krasner | |
| 5,970,631 A | 10/1999 | Inman | |
| 6,012,822 A | 1/2000 | Robinson | |
| 6,014,080 A | 1/2000 | Layson, Jr. | |
| 6,072,396 A * | 6/2000 | Gaukel | 340/573.4 |
| 6,078,260 A | 6/2000 | Desch | |
| 6,243,039 B1 | 6/2001 | Elliot | |
| 6,247,251 B1 | 6/2001 | James | |
| 6,259,399 B1 | 7/2001 | Krasner | |
| 6,263,280 B1 | 7/2001 | Stingone, Jr. | |
| 6,278,370 B1 | 8/2001 | Underwood | |
| 6,317,049 B1 | 11/2001 | Toubia et al. | |
| 6,439,941 B2 | 8/2002 | McClure et al. | |
| 6,510,380 B1 | 1/2003 | Curatolo et al. | |
| 6,545,606 B2 | 4/2003 | Piri et al. | |
| 6,567,004 B1 | 5/2003 | Landa et al. | |
| 6,701,252 B2 | 3/2004 | Brown | |
| 6,788,200 B1 | 9/2004 | Jamel et al. | |
| 6,807,127 B2 | 10/2004 | McGeever, Jr. | |
| 6,816,128 B1 | 11/2004 | Jennings | |
| 6,819,258 B1 | 11/2004 | Brown | |
| 6,826,782 B2 | 12/2004 | Jordan | |
| 6,838,998 B1 | 1/2005 | Brown et al. | |
| 6,898,525 B1 | 5/2005 | Minelli | |
| 6,944,542 B1 * | 9/2005 | Eschenbach | 701/220 |
| 6,954,175 B1 | 10/2005 | Cox | |
| 7,102,508 B2 * | 9/2006 | Edelstein et al. | 340/539.13 |
| 7,187,622 B2 | 3/2007 | Rowe | |
| 7,233,545 B2 | 6/2007 | Harvey, Jr. et al. | |
| 7,233,795 B1 | 6/2007 | Ryden | |
| 7,246,620 B2 | 7/2007 | Conroy | |
| 7,265,666 B2 | 9/2007 | Daniel | |
| 7,272,074 B2 | 9/2007 | Basilico | |
| 7,474,206 B2 | 1/2009 | Bertagna et al. | |
| RE40,879 E | 8/2009 | Jamel et al. | |
| RE41,087 E | 1/2010 | Jamel et al. | |
| RE41,102 E | 2/2010 | Jamel et al. | |
| RE41,122 E | 2/2010 | Jamel et al. | |
| 2001/0026240 A1 | 10/2001 | Neher | |
| 2001/0026242 A1 | 10/2001 | Sato et al. | |
| 2001/0053699 A1 | 12/2001 | McCrady et al. | |
| 2003/0109988 A1 * | 6/2003 | Geissler et al. | 701/213 |
| 2003/0160732 A1 | 8/2003 | Van Heerden et al. | |
| 2005/0033515 A1 * | 2/2005 | Bozzone | 701/214 |
| 2005/0261609 A1 | 11/2005 | Collings et al. | |
| 2006/0196499 A1 | 9/2006 | Cannizzaro | |
| 2007/0241887 A1 | 10/2007 | Bertagna et al. | |
| 2008/0008045 A1 | 1/2008 | Basilico | |

FOREIGN PATENT DOCUMENTS

| | | |
|---|---|---|
| GB | 2399204 A | 2/2003 |
| WO | WO 2004/080794 A | 1/2005 |

OTHER PUBLICATIONS

PCT Application No. PCT/US2009/004530, International Preliminary Report on Patentability dated Feb. 17, 2011.
U.S. Appl. No. 10/274,730, Office Action dated Sep. 15, 2003.
U.S. Appl. No. 10/274,730, Interview Summary dated Feb. 5, 2004.
U.S. Appl. No. 10/274,730, Notice of Allowance dated Apr. 22, 2004.
U.S. Appl. No. 10/274,730, Supplemental NOA dated Apr. 27, 2004.
U.S. Appl. No. 11/494,751, Office Action dated Dec. 18, 2007.
U.S. Appl. No. 11/494,751, Notice of Allowance dated Apr. 3, 2009.
U.S. Appl. No. 11/506,175, Office Action dated Oct. 29, 2007.
U.S. Appl. No. 11/506,175, Office Action dated Nov. 9, 2007.
U.S. Appl. No. 11/506,175, Office Action dated Apr. 24, 2008.
U.S. Appl. No. 11/506,175, Office Action dated Sep. 24, 2008.
U.S. Appl. No. 11/506,175, Office Action dated Dec. 10, 2008.
U.S. Appl. No. 11/506,175, Interview Summary Feb. 26, 2009.
U.S. Appl. No. 11/506,175, Notice of Allowance dated Nov. 3, 2009.
U.S. Appl. No. 11/516,805, Office Action dated Sep. 4, 2007.
U.S. Appl. No. 11/516,805, Office Action dated Apr. 28, 2008.
U.S. Appl. No. 11/516,805, Notice of Improper RCE dated Oct. 30, 2008.
U.S. Appl. No. 11/516,805, Interview Summary dated Nov. 6, 2008.
U.S. Appl. No. 11/516,805, Office Action dated Dec. 11, 2008.
U.S. Appl. No. 11/516,805, Interview Summary dated Feb. 25, 2009.
U.S. Appl. No. 11/516,805, Notice of Allowance dated Oct. 16, 2009.
U.S. Appl. No. 11/517,603, Office Action dated Jul. 12, 2007.
U.S. Appl. No. 11/517,603, Office Action dated Apr. 24, 2008.
U.S. Appl. No. 11/517,603, Office Action dated Dec. 9, 2008.
U.S. Appl. No. 11/517,603, Interview Summary dated Feb. 25, 2009.
U.S. Appl. No. 11/517,603, Notice of Allowance dated Oct. 15, 2009.
U.S. Appl. No. 11/402,195, Office Action dated Feb. 20, 2008.
U.S. Appl. No. 11/402,195, Office Action dated Nov. 17, 2008.
U.S. Appl. No. 11/402,195, Office Action dated Jun. 8, 2009.
U.S. Appl. No. 11/402,195, Office Action dated Dec. 29, 2009.
U.S. Appl. No. 11/402,195, Office Action dated Jun. 23, 2010.
U.S. Appl. No. 11/402,195, Office Action dated Feb. 23, 2011.
PCT Application No. PCT/US2007/008667, ISR and Written Opinion dated Jan. 16, 2008.
PCT Application No. PCT/US2007/008667, IPRP dated Oct. 23, 2008.
U.S. Appl. No. 11/348,292, Office Action dated Sep. 19, 2008.
U.S. Appl. No. 11/348,292, NOA dated Nov. 14, 2008.
PCT Application No. PCT/US2007/003036, ISR and WO dated Dec. 6, 2007.
PCT Application No. PCT/US2007/003036, IPRP dated Aug. 21, 2008.
U.S. Appl. No. 12/319,307, Office Action dated Dec. 29, 2009.
U.S. Appl. No. 12/319,307, Office Action dated Aug. 18, 2010.
U.S. Appl. No. 12/319,307, Notice of Allowance dated Nov. 26, 2010.

* cited by examiner

TRACKING SYSTEM WITH SEPARATED TRACKING DEVICE

BACKGROUND OF THE INVENTION

1. Field of the Invention

This invention relates generally to personal tracking devices, and more particularly to a tracking system with a separated tracking device.

2. Description of the Background Art

Personal tracking devices are known in the art. One known means of carrying a personal tracking device is to incorporate the personal tracking device into something worn or already carried by the user (e.g., footwear, cell phone, etc.). Typically, such tracking devices include a battery, a signal receiver, and a transmitter all embedded within the same portion of an article of manufacture carried or worn by the person being tracked. The signal receiver receives positioning signals (e.g., satellite signals), which get processed within the tracking device to determine the location of the device. Once the location of the tracking device is determined, the transmitter (e.g., cellular modem) transmits signals, indicative of the location, via a wireless communication link. The location of the tracking device is then made available, for example, to a subscriber monitoring the tracking device wearer via the Internet or by some other suitable means. Although such tracking devices provide advantages, there are still many obstacles to incorporating personal tracking devices into other articles of manufacture which are carried or worn by the person being tracked.

Incorporating a battery, a receiver, a transmitter, and/or other components into an article of manufacture (e.g., shoe) is problematic for several reasons. For example, obvious bulkiness could be a disadvantage in the case of a kidnapping, because the kidnapper could recognized the tracking device and simply discard the article of manufacture.

Obviously, the portion of any article of manufacture that can be adapted to receive a tracking device is typically limited, in terms of volume and space. Therefore, some articles of manufacture are considered to be unsuitable to host a tracking device, because of the size of the tracking device relative to the available volume and space within the article of manufacture.

As a specific example, it is difficult to embed such tracking devices into shoes that will be acceptable to consumers. One problem is that placing a tracking device in one shoe creates a weight imbalance between the left and right shoe. Another problem is that the size of known tracking devices make it extremely difficult to incorporate the tracking device into a shoe in such a way that the tracking device cannot be felt by the wearer. Yet another problem is that electronic components generate heat, which can cause discomfort to the wearer.

In view of the above-described problems, what is needed is a device and method for incorporating a tracking device in articles of manufacture that does not adversely affect the functionality, the appearance, and/or the comfort of the articles of manufacture. What is also needed is a means for incorporating a tracking device into articles of manufacture without unbalancing the weight and size of the articles of manufacture. What is also needed, is a means for incorporating a tracking device which minimally limits the design of the article of manufacture. What is also needed is a means for incorporating a tracking device in articles of manufacture such that the presence of the tracking device is less apparent from the outward appearance of the hosting article of manufacture. What is also needed is a means for incorporating a tracking device into articles of manufacture with limited space.

SUMMARY

One aspect of the present invention overcomes some or all the above-described problems associated with the prior art by providing a separated tracking device, which includes a first portion and a physically separate second portion. The components of the tracking device are divided between the first portion and the second portion, thereby resulting in two relatively smaller devices, instead of one relatively large tracing device. In an example embodiment, a separated tracking device is incorporated into a pair of shoes, the first portion being affixed to one shoe of the pair and the second portion being affixed to the other.

In a disclosed embodiment, the tracking device includes a first portion and a second portion. The first portion includes a location determining device (e.g., a GPS receiver) operative to receive signals from a positioning system and to generate location data based on the signals. The second portion is spaced apart from the first portion, and includes a wireless data transceiver (e.g., a mobile phone modem) operable to transmit data based on the location data to a remote system. The tracking device further includes a wireless communication device operative to communicate the location data from components of the first portion of the tracking device to components of the second portion of the tracking device. Optionally, the wireless data transceiver is also operative to receive control data specifying operational parameters for the location determining device from the remote system and to communicate the control data to the location determining device via the wireless communication device.

In an example embodiment, the first portion of the tracking device is attached to an article of footwear (e.g., one shoe of a pair) and the second portion of the tracking device is attached to a separate article of footwear (e.g., the other shoe of the pair). In other words, the separate articles of footwear are, together, a pair of shoes.

In the example embodiment, the wireless communication device includes both a first short-range wireless device and a second complementary short-range wireless device. The first short-range wireless device is electronically coupled to the location determining device, and the second short-range wireless device is electronically coupled to the data transceiver. Thus, short-range wireless communication is provided between the first portion of the tracking device and the second portion of the tracking device.

In the example embodiment, each portion of the tracking device includes its own separate battery. The first portion of the tracking device includes a first battery, and the second portion of the tracking device includes a second battery separate from said first battery. The first portion of the tracking device includes a first inductive charging component coupled to charge the first battery, and the second portion of the tracking device includes a second inductive charging component coupled to charge the second battery.

The first and second portions of the tracking device can advantageously be attached to different types of articles. For example, one of the first portion and the second portion of the tracking device can be attached to an article of footwear, and the other of the first portion and the second portion of the tracking device can be included in a hand-held device. Of course, the separate portions of the tracking device can be incorporated into any other types of articles, as long as the separate articles will generally remain within the range of the short-range wireless devices when in use.

A method for manufacturing a tracking device is also disclosed. The method comprises including a location determining device (e.g., a GPS receiver) in a first portion of a tracking device, including a wireless data transceiver (e.g., a mobile phone modem) in a second portion of the tracking device, coupling the first portion of the tracking device to a first article of manufacture, and coupling the second portion of the tracking device to a second article of manufacture. The second article of manufacture is physically separate from the first article of manufacture. The method further comprises including a first wireless communication device in the first portion of the tracking device, and including a second wireless communication device in the second portion of the tracking device. The first wireless communication device and the second wireless communication device are operative to establish wireless communication between the first portion of the tracking device and the second portion of the tracking device.

In an example method, coupling the first portion of the tracking device to the first article of manufacture includes coupling said first portion of the tracking device to an article of footwear, and coupling the second portion of the tracking device to the second article of manufacture includes coupling the second portion of the tracking device to a separate article of footwear. The first article of footwear and the second article of footwear are, together, a pair of shoes. Optionally, one of the first article of manufacture and the second article of manufacture is an article of footwear and the other of the first article of manufacture and the second article of manufacture is a hand-held device.

The example method further comprises including a first battery in the first portion of the tracking device, and including a second battery in the second portion of said tracking device. Optionally, the example method further comprises including a first inductive charging component coupled to the first battery in the first portion of the tracking device, and including a second inductive charging component coupled to the second battery in the second portion of the tracking device.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a separated tracking device. In the following description, numerous specific details are set forth (e.g., particular examples of articles of manufacture) in order to provide a thorough understanding of the invention. Those skilled in the art will recognize, however, that the invention may be practiced apart from these specific details. In other instances, details of well known footwear manufacturing and electronics assembly practices and components have been omitted, so as not to unnecessarily obscure the present invention.

Figure 1:
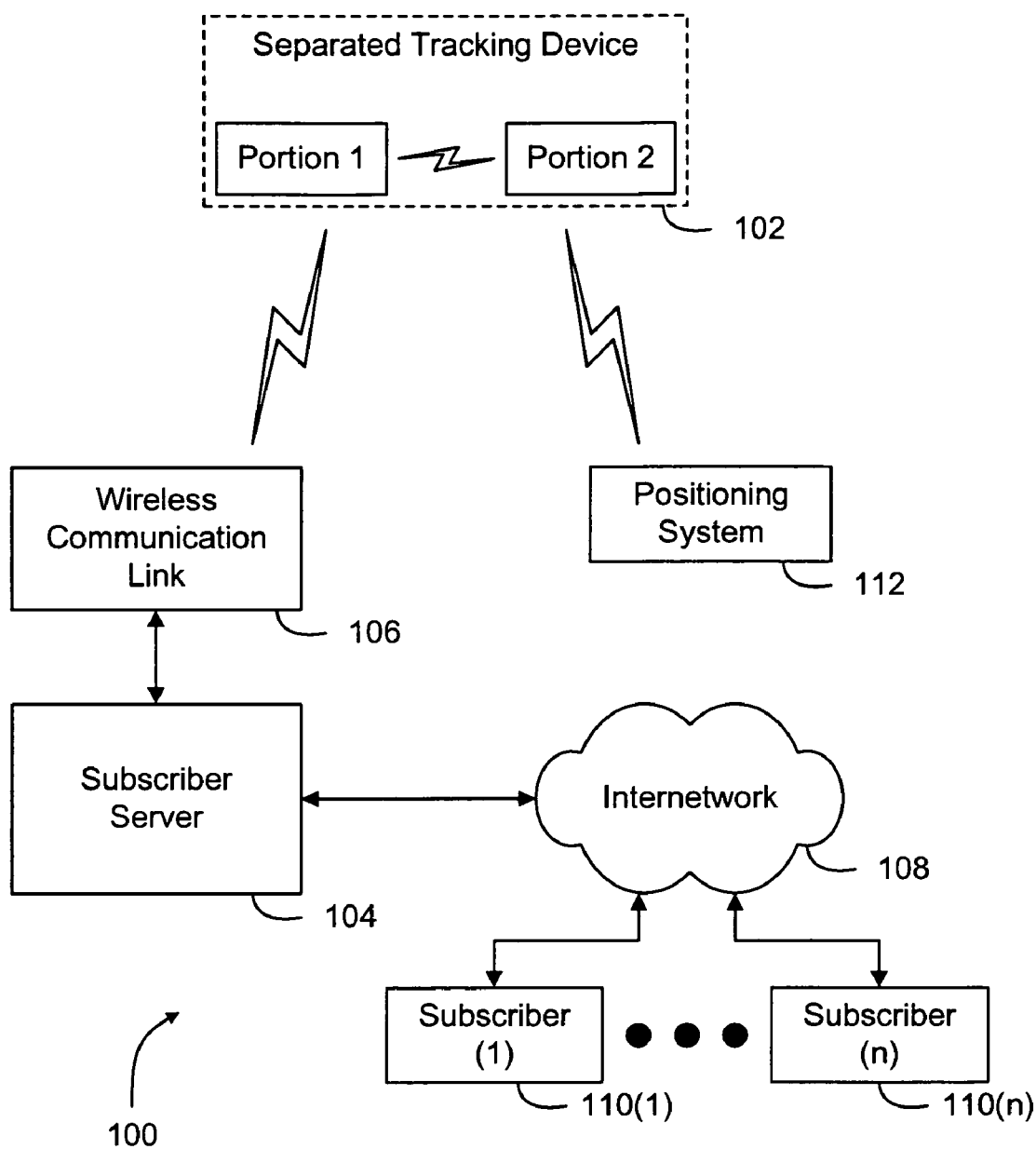
FIG. 1 is a block diagram of a tracking system.

FIG. 1 is a block diagram of a tracking system 100 including a separated tracking device 102. Tracking system 100 further includes a subscriber server 104, a wireless communication link 106, an internetwork 108, one or more subscribers 110(1-n), and a positioning system 112.

Separated tracking device 102 communicates wirelessly with subscriber server 104 via wireless communication link 106. In the particular embodiment described, wireless communications link 106 is a mobile telephone network. However, the invention is not limited to use with any particular type of mobile telephone network. Indeed, wireless communication link 106 represents any means of wireless communication, now known or yet to be discovered, that facilitates communication between separated tracking device 102 and subscriber server 104 including, but not limited to cellular networks (e.g., CDMA and GSM), satellite networks, WIFI networks, and radio communication.

Subscriber server 104 receives data from separated tracking device 102 indicative of the geographic position of separated tracking device 102, and provides the information to subscribers 110(1-n) via internetwork 108. In this particular embodiment of the invention, internetwork 108 is the Internet. However, any suitable means of communication between subscriber server 104 and subscribers 110(1-n) can be used for internetwork 108.

Subscribers 110(1-n) represent individuals with an interest in the location of the person wearing separated tracking device 102. For example tracking system 100 can be used by parents to locate children, by service departments to locate emergency service personal in the field, and so on. Subscribers 110(1-n) communicate with subscriber server 104 via internetwork 108 using some sort of client device including, but not limited to, a personal computers, a telephone, and so on.

Responsive to a command from subscriber server 104, separated tracking device 102 determines its location using location signals received from positioning system 112 and transmits data indicative of the determined system back to subscriber server 104. Positioning system 112 represents any type of satellite or terrestrial based positioning system that transmits signals that can be used to determine location. For example, a global positioning system (GPS) currently in use employs a plurality of satellites that continuously transmit signals. GPS receivers can calculate location by determining the difference in the time of receipt of signals from different satellites. GPS technology is well known, and so will not be described in detail herein.

As an alternative to a GPS type system, positioning system 112 can be incorporated into wireless communication link 106. For example, wireless telephone networks now have the capability of determining the location of mobile telephone handsets based on signals from a plurality of signal towers in the network. Wireless communication link 106 can then provide the determined location directly to separated tracking device 102, which in turn can communicate the location to subscriber server 104. As a result, positioning system 112 can be thought of as either optional or as being incorporated into wireless communication link 106.

Figure 2:
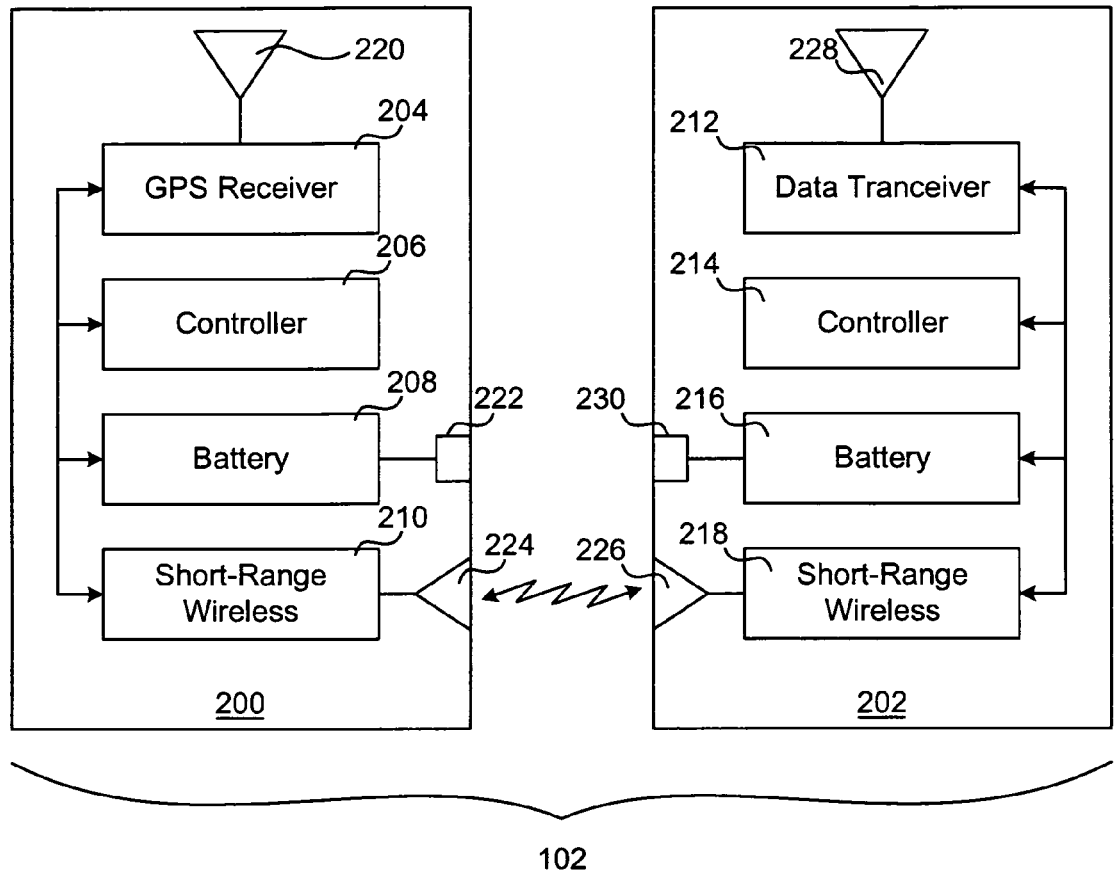
FIG. 2 is a block diagram of the separated tracking device shown in FIG. 1.

FIG. 2 is a block diagram showing separated tracking device 102 in greater detail to include a first portion 200 physically spaced apart from a second portion 202. First portion 200 includes a GPS receiver 204, a controller 206, a battery 208, and a short-range wireless device 210. Second portion 202 includes a data transceiver 212, a controller 214, a battery 216, and a short-range wireless device 218.

GPS receiver 204 is coupled to an antenna 220, which facilitates receiving positioning signals transmitted by GPS satellites. Positioning signals received by GPS receiver 204 are converted into location data indicative of the location of separated tracking device 102. Controller 206 is configured to control the operation of first portion 200, including communication with second portion 202 to provide location data and receive configuration data (e.g., data buffering, sample and reporting frequency, etc.) for GPS receiver 204. Battery 208 provides power to the components of first portion 200 and is coupled to a charging component 222, which is operable to recharge battery 208. Short-range wireless device 210 and short-range wireless device 218 facilitate short-range wireless communication between first portion 200 and second portion 202, respectively. Any of several well known short range wireless protocols can be used including, but not limited to, low power Bluetooth and wireless USB. An antenna 224 is coupled to short-range wireless device 210, and an antenna 226 is coupled to short-range wireless device 218.

Data transceiver 212 is a mobile phone modem, and is connected to an antenna 228. Data transceiver 214 facilitates communication between controller 214 and subscriber server 104 (FIG. 1) via wireless communication link 106. Controller 214 is configured to provide overall control and coordination of the operation of second portion 202. The functionality imparted by controller 214 includes, but is not limited to, receiving location data from GPS receiver 204 via short-range wireless device 218, transmitting the location data to subscriber server 104 via data transceiver 212, receiving configuration data from subscriber server 104 via data transceiver 212, and transmitting the configuration data to controller 206 and/or GPS receiver 204 via short-range wireless device 210. Of course, controller 206 cooperates with controller 214 to effect communication and coordination of function between first portion 200 and second portion 202 of separated tracking device 102. Battery 216 provides power to second portion 202, and is coupled to a charging unit 230, which facilitates the recharging of battery 216.

Separated tracking device 102 also solves another problem associated with prior art tracking devices. In particular, in prior art devices, a technology change in one component of the device (e.g., changing the location determining device from GPS to WiFi, or changing the wireless service provider associated with the data transceiver) requires that the entire device be replaced. However, in separated tracking device 102 components of first portion 200 or second portion 202 can be altered or substituted, without changing or replacing the other portion 200 or 202.

Figure 3:
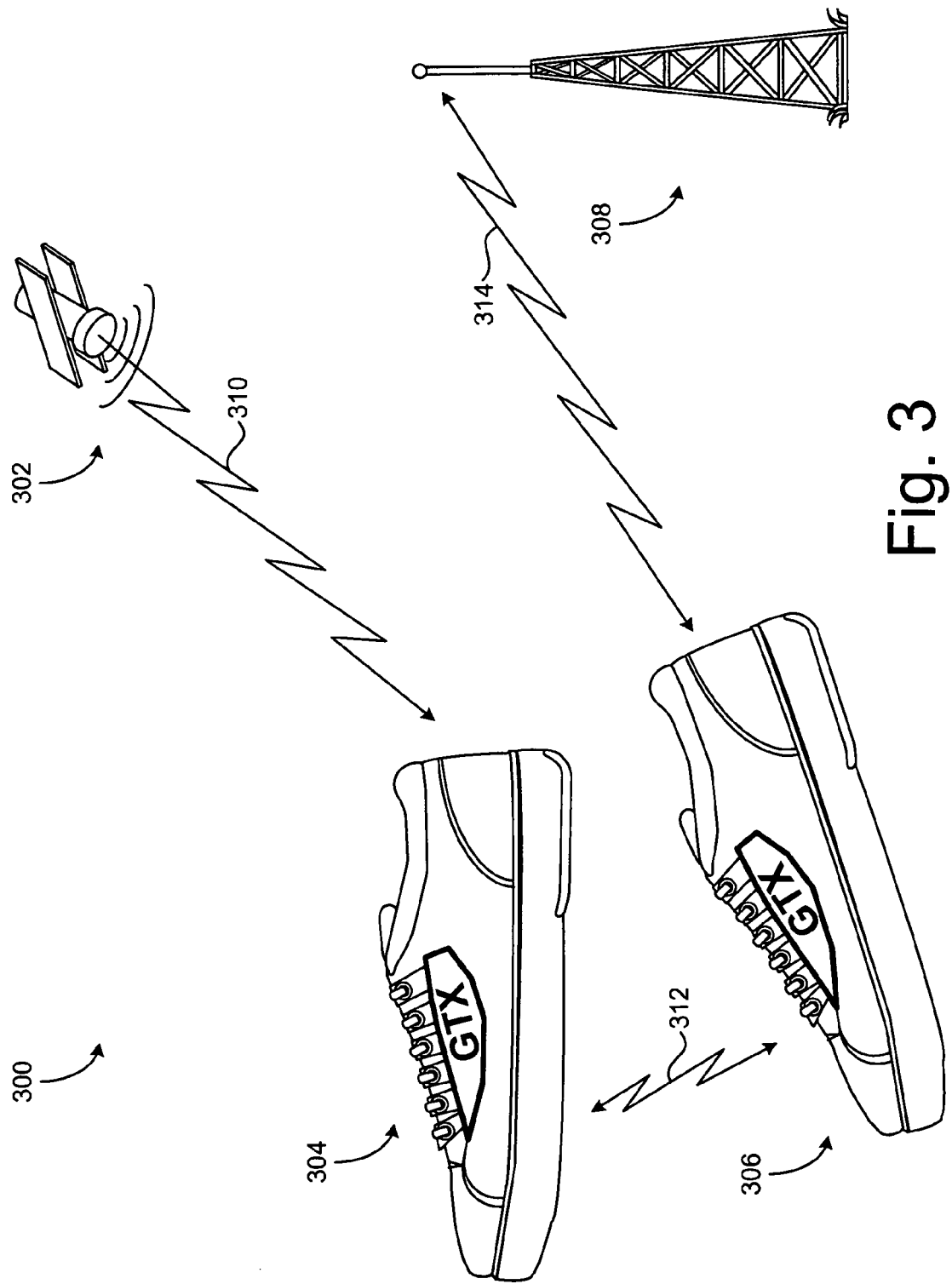
FIG. 3 shows an example of the separated tracking device of FIG. 1 incorporated into an article of manufacture (a pair of shoes)

FIG. 3 shows an example of a tracking system 300 with separated tracking device 102 (not visible in FIG. 3) incorporated into a pair of shoes 304 and 306. In addition to the concealed tracking device, system 300 includes a satellite positioning system 302 and a wireless telephone network 308, which provides connectivity to a subscriber server 104 (also not visible in FIG. 3). It is commonly known that global positioning systems function using several signal transmitting satellites, therefore, satellite 302 and signal 310, transmitting therefrom, represent a plurality of satellites and a plurality of satellite signals, respectively.

As shown in FIG. 3, satellite 302 transmits positioning signals 310 which are received by the first portion 200 of tracking device 102 in shoe 304. Signals 310 are processed into location data representing the current longitudinal and latitudinal coordinates of shoe 304. After the location data is generated within shoe 304, the location data is transmitted to second portion 202 of tracking device 102 concealed in shoe 306 via short-range wireless signal 312. The second portion 202 of tracking device 102 in shoe 306 then transmits the location data via wireless telephone network 308 to subscriber server 104.

Figure 4:
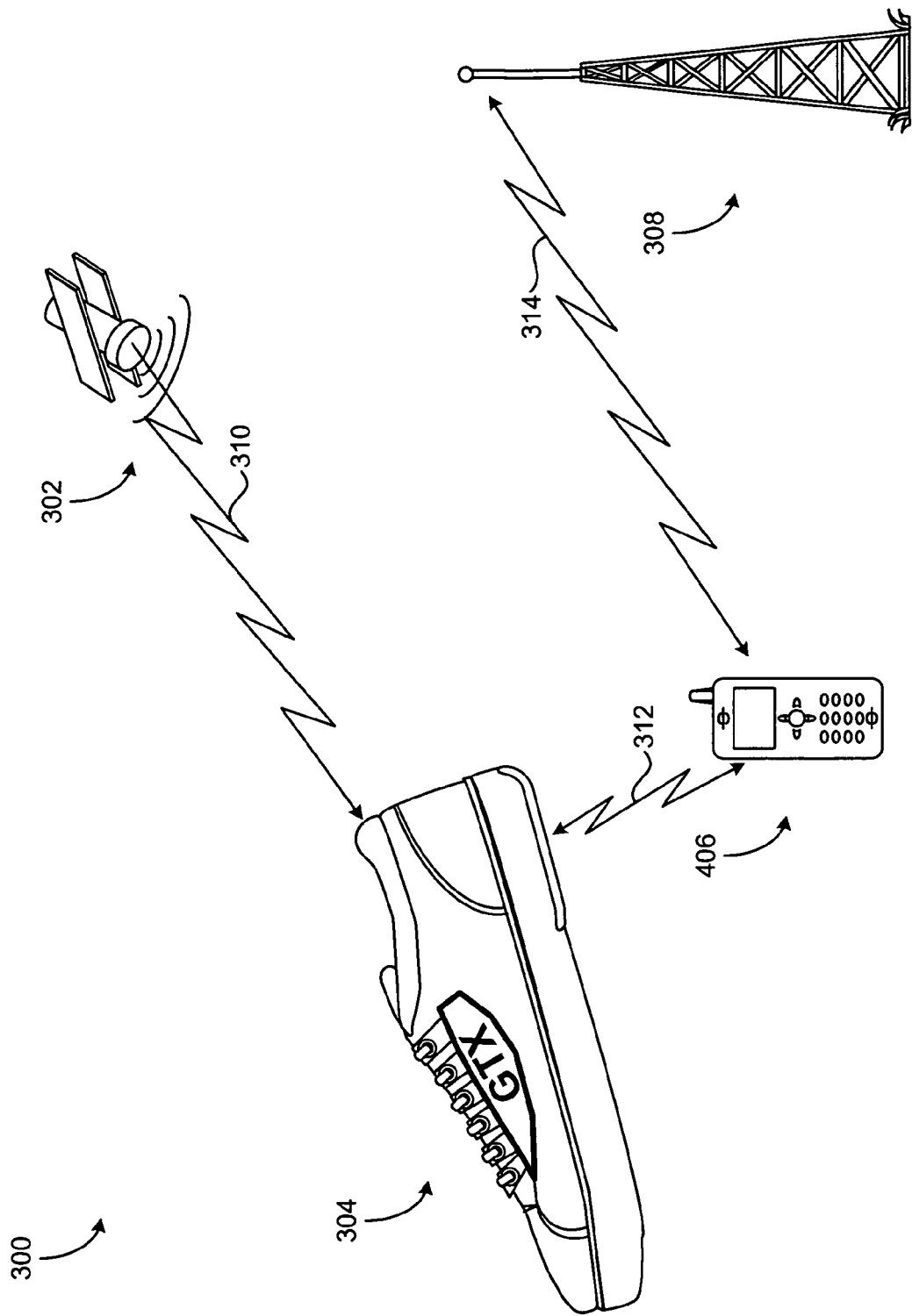
FIG. 4 shows an example of the separated tracking device of FIG. 1 incorporated into alternate articles of manufacture (a shoe and a hand-held device)

FIG. 4 shows tracking system 300 with separated tracking device 102 (not visible) incorporated into an alternate article of manufacture. In particular, second portion 202 of tracking device 102 is incorporated in a hand-held device 406 (e.g., a cell phone, personal data device, etc.). The functionality of second portion 202 of tracking device 102 is the same as in the previously described embodiments, except that some of the components (data transceiver 212, battery 216, controller 214) may be shared by tracking device 102 and hand-held device 406.

Figure 5:
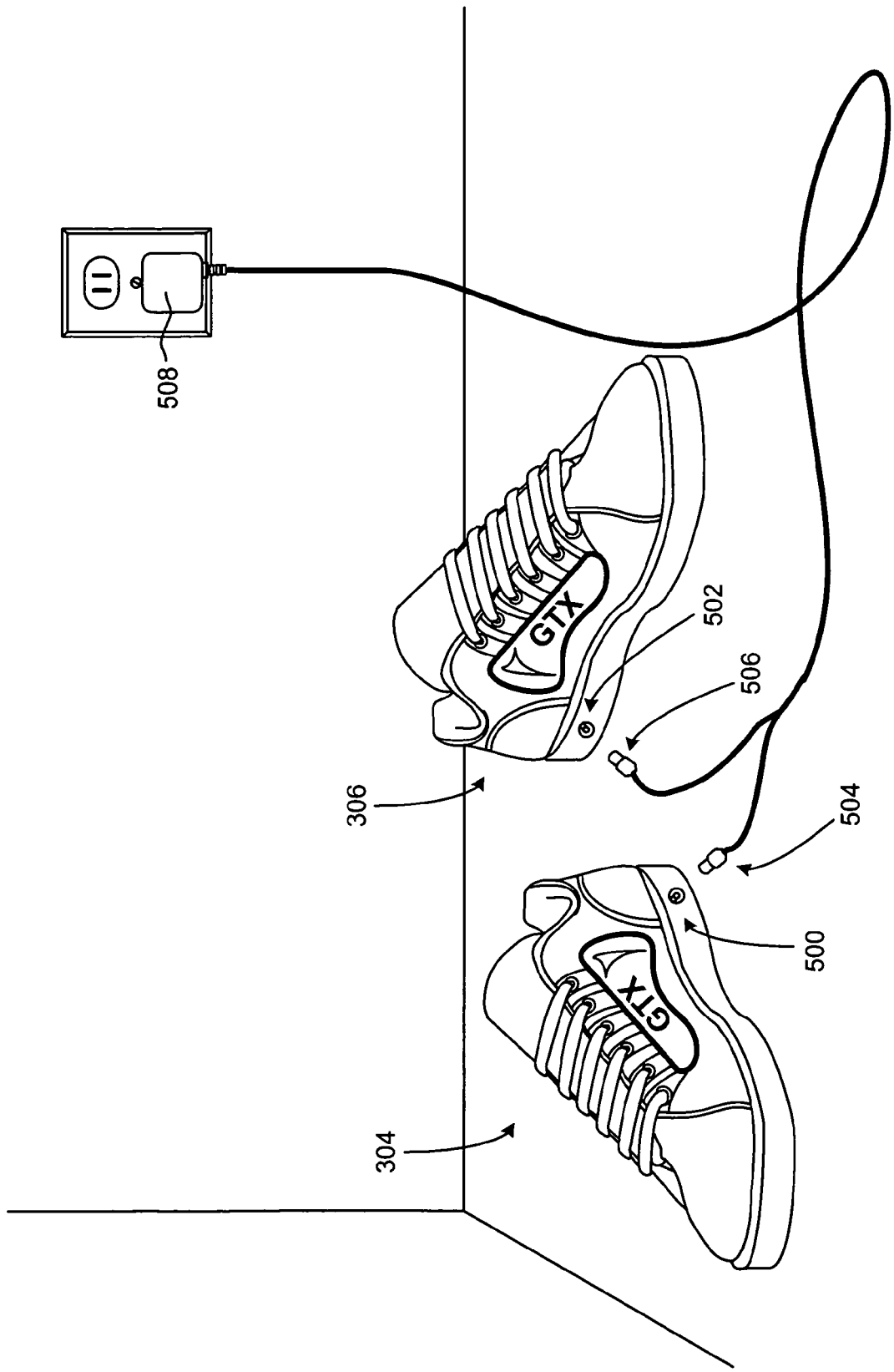
FIG. 5 shows a example system for charging the shoes of FIG. 3.

FIG. 5 shows a perspective view of shoes 304 and 306, wherein charging units 222 and 230 include charger receiving jacks 500 and 502, respectively. Each of jacks 500 and 502 are adapted to receive electrical connectors 604 and 606, respectively, of a conventional AC/DC charging adaptor 608 to facilitate the charging of batteries within shoes 304 and 306.

Figure 6:
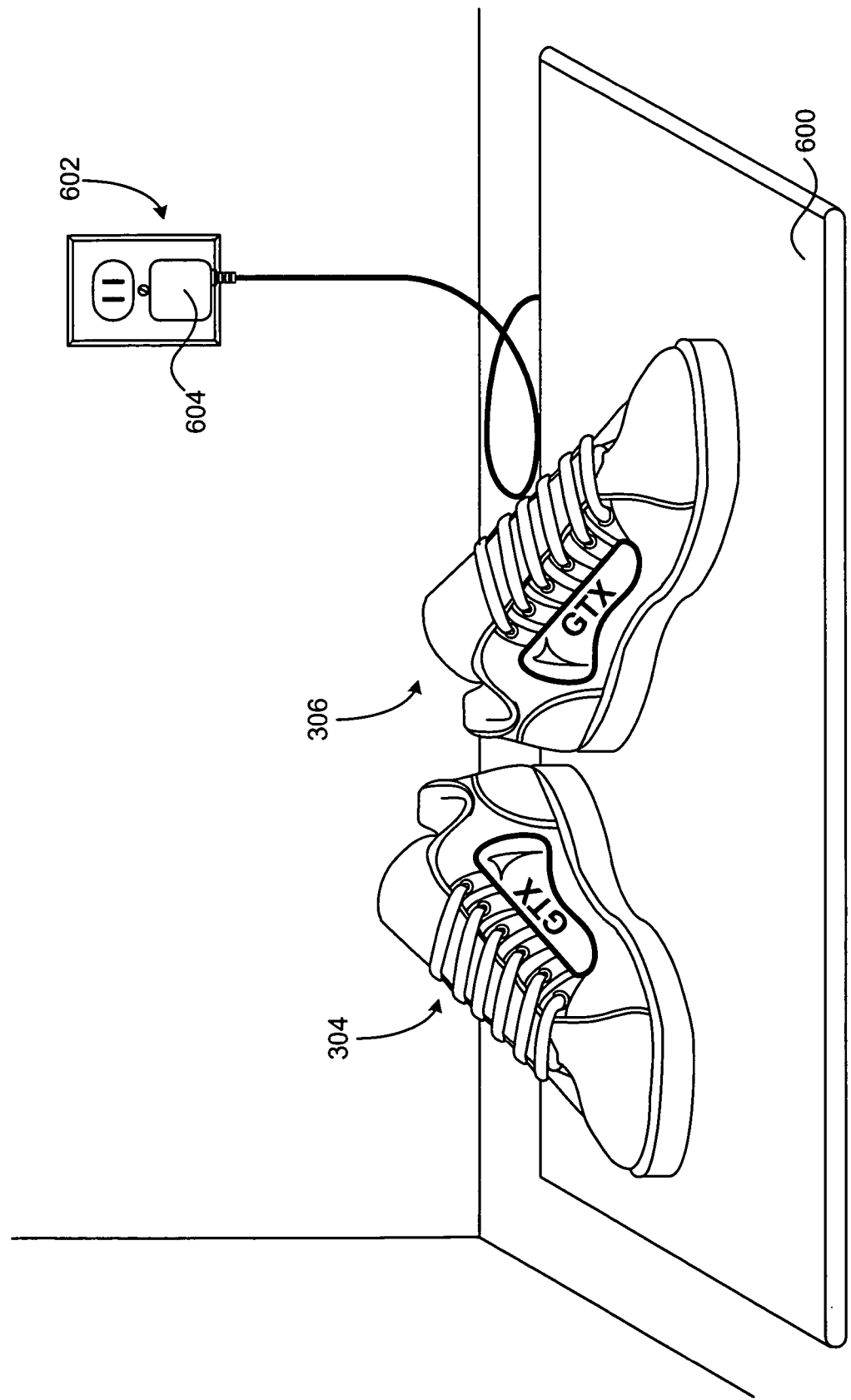
FIG. 6 shows an alternative system for charging the shoes of FIG. 3.

FIG. 6 is an example embodiment showing an alternative system for charging shoes 304 and 306. In this alternate embodiment, charging units 222 and 230 include inductive charging coils. Shoes 304 and 306 are shown charging on an inductive charging pad 600 plugged into a conventional household outlet 602 via an AC adaptor 604. Inductive charging pad 600 includes a plurality of embedded coils which provide electromagnetic fields to induce electrical currents through the inductive elements (e.g., inductance coils) of charging units 222 and 230. Thus, inductive charging pad 600 enables shoes 304 and 306 to be wirelessly charged without exposing any conductive portion of shoes 304 and 306.

Figure 7:
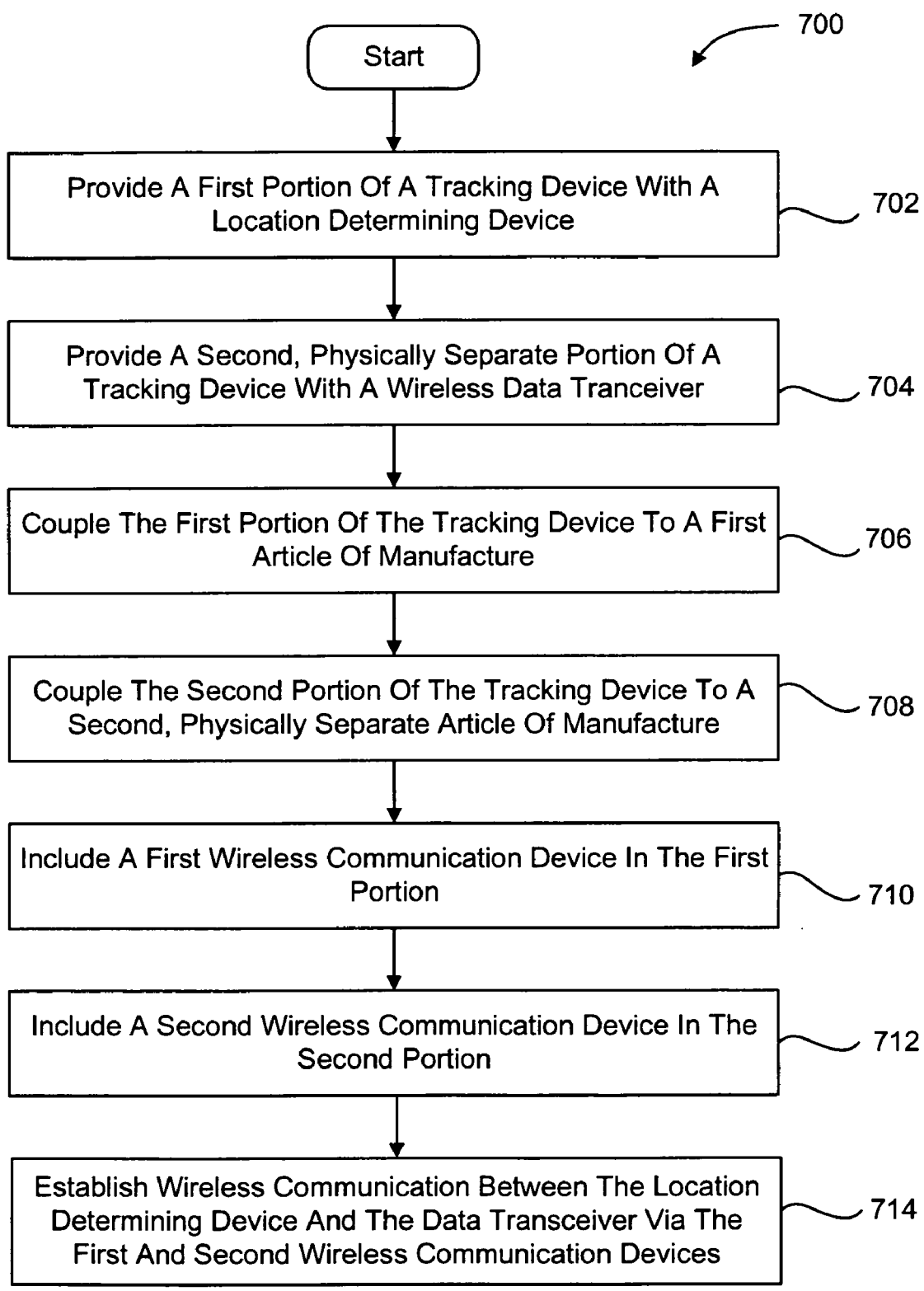
FIG. 7 is a flow chart summarizing an example method for manufacturing a tracking device.

FIG. 7 is a flow-chart summarizing a method 700 for manufacturing a tracking device. In a first step 702, a first portion of a tracking device with a location determining device is provided. Then, in a second step 704, a second, physically separate portion of the tracking device with a wireless data transceiver is provided. Next, in a third step 706, the first portion of the tracking device is coupled to a first article of manufacture. Then, in a fourth step 708, the second portion of the tracking device is coupled to a second, physically separate article of manufacture. Next, in a fifth step 710, a first wireless communication device is included in the first portion of the tracking device. Then, in a sixth step 712, a second wireless communication device is included in the second portion of the tracking device. Next, in a seventh step 714, wireless communication between the location determining device and the data transceiver is established via the first and second wireless communication devices. It should be understood that the steps of method 700 need not be performed in the order presented. For example, the first and second wireless communication devices can be incorporated into the first and second portions of the tracking device, respectively, before the portions of the tracking device are coupled to the articles of manufacture.

Figure 8:
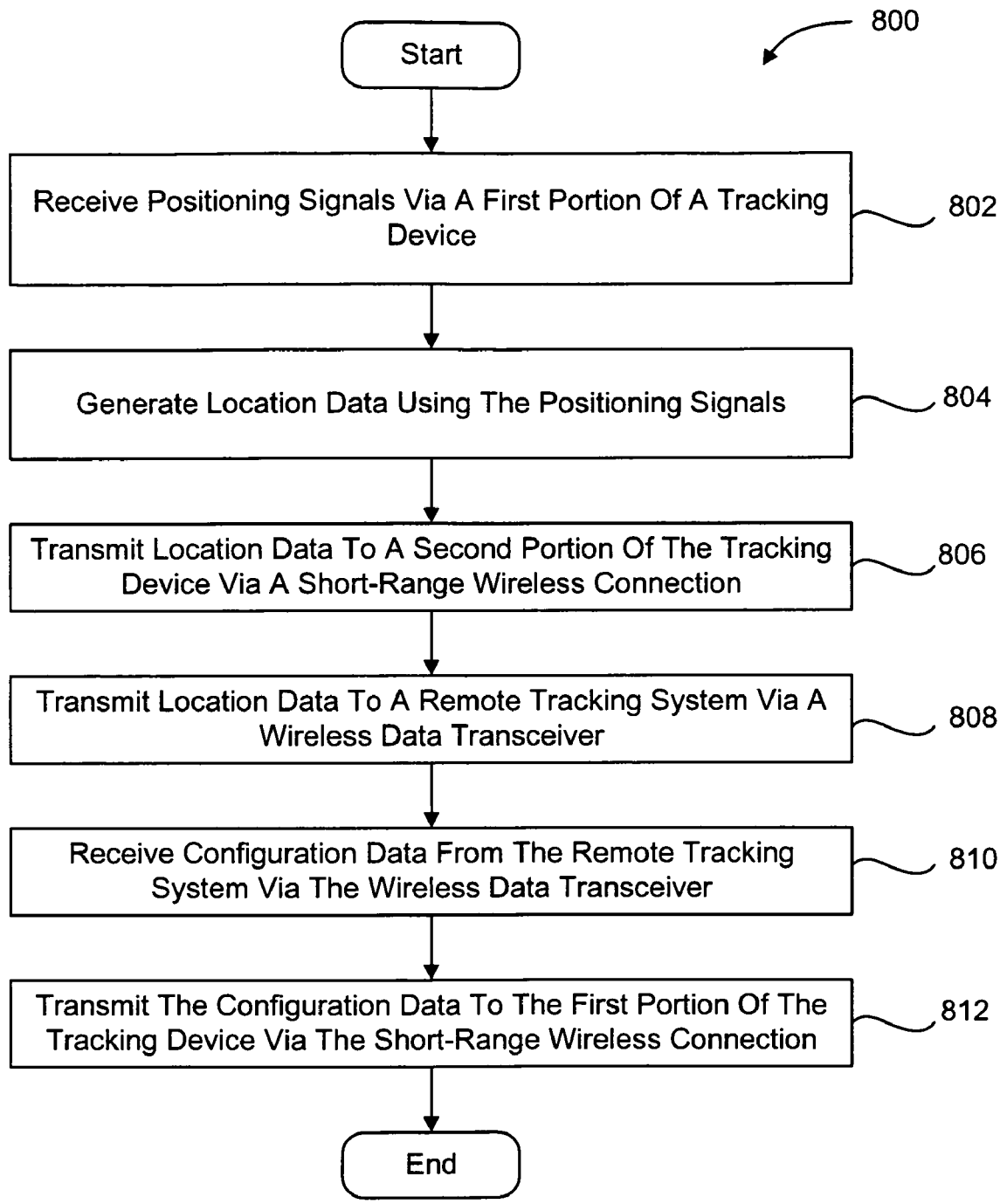
FIG. 8 is a flow chart summarizing a method of operation for a separated tracking device.

FIG. 8 is a flow-chart summarizing a method 800 of operation for a separated tracking device. In a first step 802, a first portion of the tracking device receives positioning signals. Then, in a second step 804, location data is generated using the positioning signals. Next, in a third step 806, the location data is transmitted to a second portion of the tracking device via a short-range wireless connection. Then, in a fourth step 808, the location data is transmitted to a remote tracking system via a wireless data transceiver. Next, in a fifth step 810, the second portion of the tracking device receives configuration data from the remote system via the wireless data transceiver. Then, in a sixth step 812, the configuration data is transmitted to the first portion of the tracking device via the short-range wireless connection.

The description of particular embodiments of the present invention is now complete. Many of the described features may be substituted, altered or omitted without departing from the scope of the invention. For example, alternate positioning systems (e.g., triangulation based on cell phone signals, WiFi hotspots, etc.), may be substituted for the satellite GPS system disclosed. As another example, the separate portions of the tracking device can be incorporated in other articles of manufacture (e.g., a helmet and a wristband, opposite shoulders of a jacket, and so on.). These and other deviations from the particular embodiments shown will be apparent to those skilled in the art, particularly in view of the foregoing disclosure.

We claim:

1. A tracking device comprising:
   a first portion attached to an article of footwear, said first portion of said tracking device including a location determining device operative to receive signals from a positioning system and to generate location data based on said signals, said location data indicative of a location of said tracking device;
   a second portion attached to a separate article of footwear, said second portion of said tracking device being spaced apart from said first portion, said second portion including a wireless data transceiver operable to transmit data based at least in part on said location data to a remote system; and
   a wireless communication device operative to communicate said location data from said first portion of said tracking device to said second portion of said tracking device; and wherein
   said article of footwear and said separate article of footwear are, together, a pair of footwear.

2. A tracking device according to claim 1, wherein said pair of footwear is a pair of shoes.

3. A tracking device according to claim 1, wherein said wireless communication device includes:
   a first short-range wireless device electronically coupled to said location determining device; and
   a second short-range wireless device electronically coupled to said data transceiver.

4. A tracking device according to claim 1, wherein:
   said first portion of said tracking device includes a first battery; and
   said second portion of said tracking device includes a second battery separate from said first battery.

5. A tracking device according to claim 4, wherein:
   said first portion of said tracking device includes a first inductive charging component coupled to charge said first battery; and
   said second portion of said tracking device includes a second inductive charging component coupled to charge said second battery.

6. A tracking device according to claim 1, wherein said location determining device includes a GPS receiver.

7. A tracking device according to claim 6, wherein said wireless data transceiver includes a mobile phone modem.

8. A tracking device according to claim 1, wherein said wireless data transceiver includes a mobile phone modem.

9. A tracking device according to claim 1, wherein said wireless data transceiver is operative to receive control data specifying operational parameters for said location determining device from said remote system and to communicate said control data to said location determining device via said wireless communication device.

10. A method of manufacturing a tracking device, said method comprising:
    including a location determining device in a first portion of a tracking device;
    including a wireless data transceiver in a second portion of a tracking device;
    coupling said first portion of said tracking device to a first article of footwear;
    coupling said second portion of said tracking device to a second article of footwear, said second article of footwear being physically separate from said first article of footwear;
    including a first wireless communication device in said first portion of said tracking device; and
    including a second wireless communication device in said second portion of said tracking device, said first wireless communication device and said second wireless communication device being operative to establish wireless communication between said first portion of said tracking device and said second portion of said tracking device; and wherein
    said first article of footwear and said second article of footwear are, together, a pair of footwear.

11. The method of claim 10, wherein said pair of footwear is a pair of shoes.

12. The method of claim 10, further comprising:
    including a first battery in said first portion of said tracking device; and
    including a second battery in said second portion of said tracking device.

13. The method of claim 12, further comprising:
    including a first inductive charging component coupled to said first battery in said first portion of said tracking device; and
    including a second inductive charging component coupled to said second battery in said second portion of said tracking device.

14. The method of claim 10, wherein said location determining device includes a GPS receiver.

15. The method of claim 14, wherein said wireless data transceiver includes a mobile phone modem.

16. The method of claim 10, wherein said wireless data transceiver includes a mobile phone modem.

17. The method of claim 10, wherein said wireless data transceiver is operative to receive control data specifying operational parameters for said location determining device via said wireless data transceiver, and to communicate said control data to said location determining device via said wireless communication device.

18. A tracking device including:
    a first portion attached to an article of footwear, said first portion of said tracking device including a location determining device operative to receive signals from a positioning system and to generate location data based on said signals, said location data indicative of a location of said tracking device;
    a second portion attached to a separate article of footwear, said second portion of said tracking device being spaced apart from said first portion, said second portion including a wireless data transceiver operable to transmit data based at least in part on said location data to a remote system; and means for communicating between said first portion of said tracking device and said second portion of said tracking device; and wherein said article of footwear and said separate article of footwear are, together, a pair of footwear.

19. A tracking device according to claim 18, wherein said pair of footwear is a pair of shoes.

* * * * *